United States Patent [19]

Yoshikawa et al.

[11] Patent Number: 4,791,548
[45] Date of Patent: Dec. 13, 1988

[54] DISCRETE TIME CONTROL APPARATUS

[75] Inventors: Norio Yoshikawa, Minamimachi; Tadaaki Hotta, Kyoto, both of Japan

[73] Assignee: Omron Tateisi Electronics Co., Kyoto, Japan

[21] Appl. No.: 853,555

[22] Filed: Apr. 18, 1986

[30] Foreign Application Priority Data

Apr. 19, 1985 [JP] Japan .................................. 60-84879

[51] Int. Cl.$^4$ ........................ G05B 13/04; G05B 21/02
[52] U.S. Cl. .................................... 364/149; 318/561; 318/636; 364/151; 364/158; 364/164; 364/160; 364/178
[58] Field of Search ............... 364/149, 151, 148, 150, 364/160, 161, 162, 163, 157, 158, 159, 164, 165, 176, 178, 179, 180; 318/561, 609, 610, 632, 636, 590, 596

[56] References Cited

U.S. PATENT DOCUMENTS

| 3,826,887 | 7/1974 | Pemberton . | |
|---|---|---|---|
| 3,940,594 | 2/1976 | Bleak et al. | 364/161 |
| 4,213,175 | 7/1980 | Kurihara | 364/151 |
| 4,214,300 | 7/1980 | Barlow et al. | 364/162 |
| 4,214,301 | 7/1980 | Kurihara et al. | 364/150 |
| 4,232,364 | 11/1980 | Bibbero | 364/162 |
| 4,368,510 | 1/1983 | Anderson | 364/151 |
| 4,408,148 | 10/1983 | Herzog | 364/162 |
| 4,432,048 | 2/1984 | Ito et al. | 364/161 |
| 4,549,123 | 10/1985 | Hagglund et al. | 364/162 |
| 4,580,208 | 4/1986 | Sukimoto et al. | 364/162 |

FOREIGN PATENT DOCUMENTS 0128491 1/1984 European Pat. Off. .

Primary Examiner—Joseph Ruggiero
Attorney, Agent, or Firm—Foley & Lardner, Schwartz, Jeffery, Schwaab, Mack, Blumenthal & Evans

[57] ABSTRACT

Under a transient condition, a control variable is detected at each sampling interval, and operation on a controlled system is effected in a binary switching mode at each sampling interval. Parameters of a model for the controlled system are estimated on the basis of past controlled and manipulated variables, and a controlled variable sequence that can be predicted in response to application of a controlled variable over several future steps to the model is estimated, so that the system is controlled in order to render the controlled variable optimum. Under a normal operating condition, parameters are computed from the model for the control system that is obtained upon control under the transient condition, and the system is controlled by continuous manipulated-variable sampling control.

8 Claims, 4 Drawing Sheets

DISCRETE TIME CONTROL APPARATUS

BACKGROUND OF THE INVENTION

1. Field of the Invention

The present invention relates to a discrete time control apparatus for controlling a system with continuous time, and more particularly to a discrete time control apparatus having a discrete-time adaptive switching control capability and a continuous manipulated-variable sampling control capability.

2. Description of the Prior Art

PID (Proportional, plus Integral plus Derivative) controls are widely employed for controlling the processes in plastics processing, industrial furnaces, chemical plants, and the like. In order to control systems properly with such PID controls, it is necessary to establish PID parameters accurately. The tuning of PID parameters has been dependent largely on the experience of operators involved in the control practice, and it has been difficult for the operators to set appropriate PID parameters when the characteristics of the controlled systems vary significantly. To eliminate such difficulty, there has heretofore been proposed an automatic tuning PID control apparatus employing the step response method or the ultimate sensitivity method. With such an automatic PID control apparatus, however, it is necessary to operate the controlled system in advance for parameter tuning, and difficulty has been experienced in achieving desired response at the starting time of operating the controlled system, changing a preset value and achieving the stability in a normal operating condition.

There has also been proposed a discrete-time adaptive switching control (hereinafter referred to as "ASC") apparatus using an inexpensive and rugged binary switching actuator for actuating a controlled system with a continuous quantity (Japanese Patent Application No. 59-113781). It is known that the ASC apparatus is much better than conventional PID controllers with respect to operation starting characteristics and settling ability against disturbance in controlled systems having a relatively large time constant, such as temperature control systems. However, the ASC apparatus has the disadvantage that the sampling period cannot be greatly reduced, since the manipulated variables are of two values, i.e., ON and OFF states, and a large amount of arithmetic operation is required. As a result, the controlled variable varies to a larger extent under normal operating condition than general sampling control apparatus employing continuous manipulated variables.

SUMMARY OF THE INVENTION

It is an object of the present invention to provide a discrete time control apparatus for controlling a system in continuous time, the apparatus employing an ASC capability for improving the response at the time of starting operation of the controlled system and when changing a preset value, and further being capable of improving the stability under normal operating condition and of automatically determining controlling parameters through an automatic tuning process.

According to the present invention, there is provided a discrete time control apparatus for controlling a system in continuous time. A sampling/detecting apparatus detects a controlled system variable at each sampling interval. A controller selectively switches operation on the system, at each sampling interval, between a binary switching mode and a continuous mode in response to an external input. A discrete-time adaptive switching control (ASC) estimates and updates model parameters at each sampling interval, based on a manipulated variable to be applied to an actuator for effecting the binary switching mode and the controlled variable detected by the sampling/detecting apparatus in order to adapt a discrete-time model to the system. The ASC also selects a sequence of predicted controlled variables over predictable sampling intervals in response to application of a possible controlled-variable sequence over certain sampling intervals of the discrete-time model, thereby determining a controlled variable for the actuator. A continuous manipulated-variable sampling control computes parameters based on the discrete-time model estimated by the discrete-time adapative switching control (ASC) effecting continuous control on the system. Switches are used for selecting, one at a time, discrete-time adaptive switching control and continuous manipulated-variable sampling control based on a target preset value and the present controlled variable.

Under a transient condition, the control variable is detected at each sampling interval, and operation on the controlled system is effected in the binary switching mode. Parameters of the model for the controlled system are estimated on the basis of past controlled and manipulated variables, and a controlled variable sequence that can be predicted in response to application of a controlled variable over several future steps to the model is estimated, so that the system is controlled in order to optimize the controlled variable. Under a normal operating condition, parameters are computed from the model for the control system that is obtained upon control under the transient condition, and the system is controlled by continuous manipulated-variable sampling control.

Therefore, under the transient condition such as when starting the system or changing the preset value, the adaptive switching control function is employed to achieve quick responsive control characteristics with reduced overshoot. Under normal operating conditions, the continuous manipulated-variable sampling control function is used to determine the parameters of the discrete-time model for the system estimated by the adaptive switching control function, thereby effecting automatic parameter tuning. The normal and transient conditions are automatically selected one at a time. Therefore, when the system is started or a preset value is changed, the control characteristics are improved in that the response is increased and the overshoot is reduced. The system can also be controlled stably with reduced variations under the normal condition. Since the parameters for continuous manipulated-variable sampling control are determined by the discrete-time model, it is not necessary to effect parameter tuning, and the system is therefore not required to be operated in advance for parameter tuning. Therefore, the control apparatus is easy to operate.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
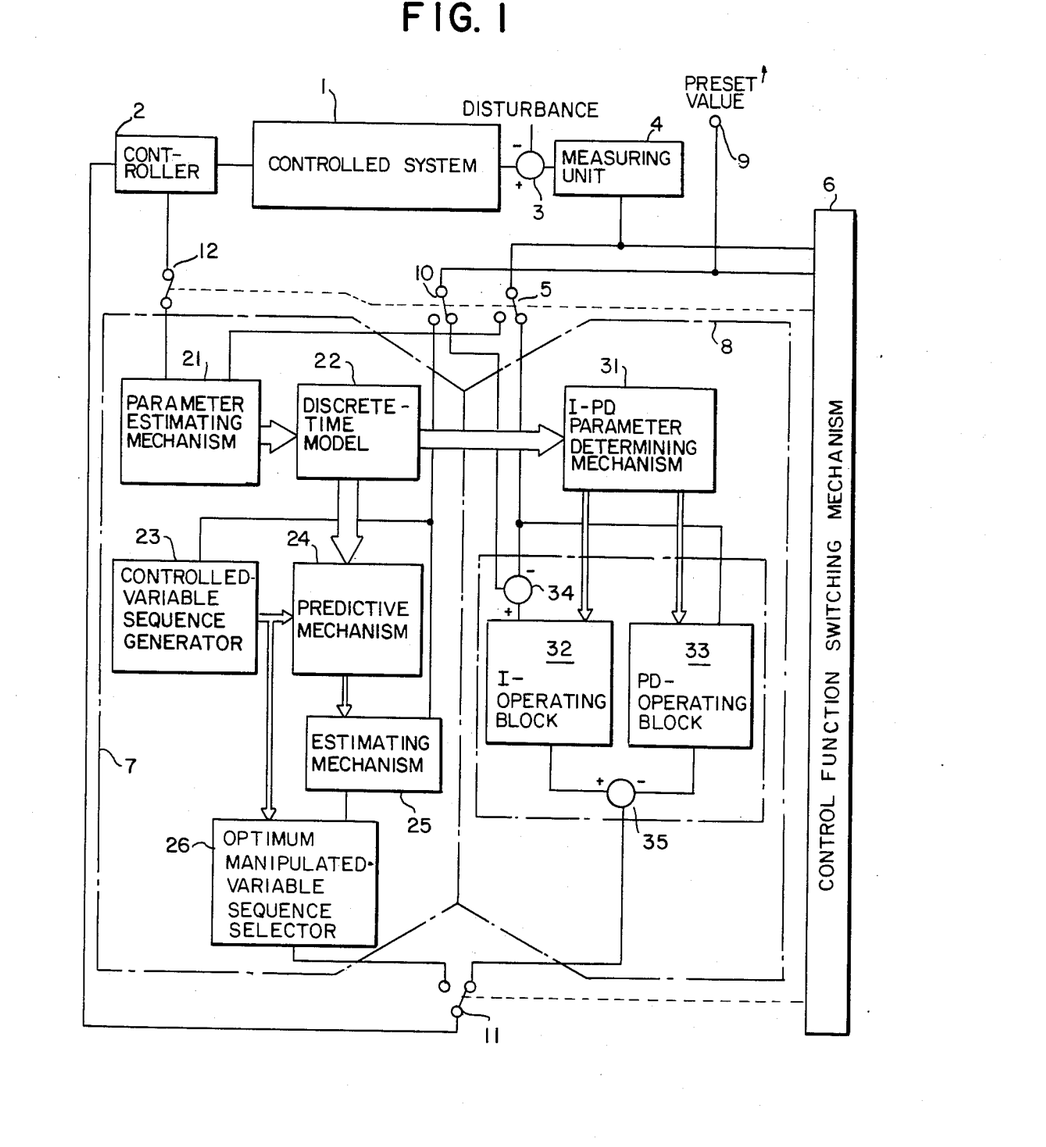
FIG. 1 is a block diagram of a discrete time control apparatus according to the present invention.

FIG. 1 shows in conceptual block form a discrete timing control apparatus according to the present invention. The discrete time control apparatus has an ASC capability and a normal-condition control capability, as shown. A controlled system 1 is associated with a controller 2 having an ability to hold an input signal. For example, if the controlled system 1 is a plastic processing system, the controller 2 may be a heater. A controlled variable, such as temperature, of the controlled system 1, to which there is added disturbance at a adding point 3, is measured by a measuring unit 4, and sampled at a prescribed period. The sampled variable is then applied to a changeover switch 5 and a control function switching mechanism 6. The changeover switch 5 serves to selectively apply the controlled variable measured from the controlled system 1 to an ASC function block 7 or a normal-condition control function block 8. A preset value for the controlled system 1 is applied via a terminal 9 to the control function switching mechanism 6 and a switch 10. The ASC function block 7 is applied with the sampled controlled variable via the changeover switch 5 from the measuring unit 4 and the preset value through the switch 10 for effecting binary switching operatin on the controlled system 1 at each sampling period. The ASC function block 7 is used for performing control under a transient condition to apply a sequence of optimum manipulated variables to a switch 11. The normal-condition control function block 8 is supplied with the preset value from the switch 10 and the sampled controlled value from the switch 5, and also with a discrete-time model parameter estimated by the ASC function block 7, as described later on. The normal-condition control function block 8 serves to effect continuous manipulated-variable sampling control on the controlled system 1, and applies its output to the switch 11. The control function switching mechanism 6 shifts the switches 5, 10, 11 at the same time to selectively apply the outputs therefrom to the controller 2, and simultaneously applies the optimum manipulated-variable sequence held by the controller 2 to the ASC function block 7 through a switch 12. The control function switching mechanism 6 discriminates between a transient condition and a normal operating condition based on the preset value and the controlled variable obtained from the measuring unit 4 then selectively operates the ASC function block 7 and the normal-condition control function block 8.

ASC function block:

The ASC function block 7 will hereinafter be described in greater detail. The controlled variable, such as temperature of the controlled system 1, is extracted by the measuring unit 4 at each constant sampling period T. For estimating parameters of the controlled system 1, there are employed a controlled variable Y(i) measured at the time interval T and a manipulated variable U(i) actually applied to the controlled system 1. Controlled and manipulated variables (yi, ui) are given by the following equations, which subtract DC components of balanced values (uo, yo) of the controlled and manipulated variables at the time of starting system operation from the above values Y(i), U(i):

$$y(i) = Y(i) - Yo$$
$$u(i) = U(i) - Uo \qquad (1)$$

where i is a parameter expressing time, T, discretely, the time being indicated by i (i=0, 1, 2, ...), using the sampling period T. These manipulated and controlled variables u(i), y(i) are employed in a parameter estimating block 21 to determine a discrete-time model 22 for the controlled system. This discrete-time model 22 is given by the following equation:

$$\hat{G}(z) = \frac{\hat{B}(z^{-1})}{\hat{A}(z^{-1})} \qquad (2)$$

where $\hat{G}$ is the transfer function of the controlled system, and $\hat{A}(z^{-1})$ and $\hat{B}(z^{-1})$ are given by the following equation ( ^ indicates an estimated value):

$$\hat{A}(z^{-1}) = 1 + \hat{a}_1 z^{-1} + \ldots + \hat{a}_n z^{-n}$$
$$\hat{B}(z^{-1}) = \hat{b}_1 z^{-1} + \ldots + \hat{b}_n z^{-n} \qquad (3)$$

$\hat{a}_1, \ldots, \hat{a}_n, \hat{b}_1, \ldots, \hat{b}_n$ are parameters to be estimated by the parameter estimating block 21. The dimension n of the discrete-time model is appropriately selected depending on the system to be controlled.

Using the above transfer function, the controlled variable y(i) and the manipulated variable u(i) at an ith sampling time is indicated by:

$$y(i) = \hat{G}(z)u(i) \qquad (4)$$

These parameters $\hat{a}_i$, $\hat{b}_i$, manipulated variable $u_i$, and controlled variable $y_i$ are described as vectors as follows (the symbol _ indicates a vector):

Parameter vector:

$$\theta(i) = \begin{pmatrix} \hat{a}_1 \\ \vdots \\ \hat{a}_n \\ \hat{b}_1 \\ \vdots \\ \hat{b}_n \end{pmatrix} \qquad (5)$$

$$= (\hat{a}_1 \ldots \hat{a}_n \mid \hat{b}_1 \ldots \hat{b}_n)^T$$

Signal vector:

$$x(i) = (-y(i-1) \ldots -y(i-n) | u(i-1) \ldots u(i-n))^T \quad (6)$$

The above parameter estimating method is described below. The parameters are estimated by the successive least square estimating method, for example, and the parameter estimation can be achieved by minimizing the so-called equation residual e(i) of a loss function:

$$e(i) = y(i) - x^T(i) \cdot \hat{\theta}(i-1) \quad (7)$$

The successive estimation of the parameter vector $\hat{\theta}$ is accomplished by adding an corrective term, i.e., the product of the equation residual e(i) and a corrective vector g(i) to a preceding parameter vector $\hat{\theta}(i-1)$. Thus, the successive estimation equation is given as follows:

$$\hat{\theta}(i) = \hat{\theta}(i-1) + g(i) \cdot e(i) \quad (8)$$

The corrective vector g(i) includes a scaler quantity (equation (10)) and a covariance matrix (equation (11)) in which the parameter resisual is normalized.

$$g(i) = \frac{1}{\alpha^2(i)} \cdot P(i-1) \cdot x(i) \quad (9)$$

$$\alpha^2(i) = x^T(i) \cdot P(i-1) \cdot x(i) + \rho; \, 0 < \rho \leq 1 \quad (10)$$

$$P(i) = (I - g(i) \cdot x^T(i)) \cdot P(i-1)/\rho \quad (11)$$

(I = unit matrix)

The adaptive coefficient $\rho$ in the equation (10) and (11) is indicative of the weight of the data and serves to estimate the present data to be greater than the past measured values. The parameters can be varied to a larger extent by selecting $\rho$ to meet the condition $\rho < 1$. The freedom with which the parameters can be changed is thus widened for the greater ease with which the controlled system that varies with time can be followed.

A general description of the parameter estimation is given by the following papers (1):

Astrom/Eykoff "System Identification—A Survey", Automatica, Vol. 7, pp. 123-162, Pergamon Press, 1971, and V. Strejc "Least Squares Parameter Estimation", Automatica, Vol, 16, pp. 535-555, Pergamon Press, 1980.

Figure 2A:
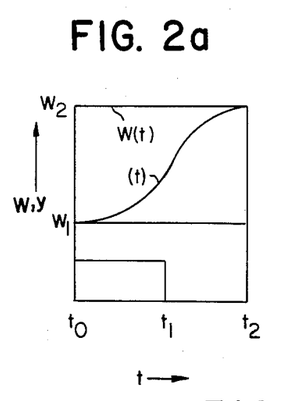
FIG. 2(a) is a diagram showing the manner in which a controlled variable approaches a new target value when a manipulated variable is changed once under a transient condition for continuous time control.
Figure 2B:
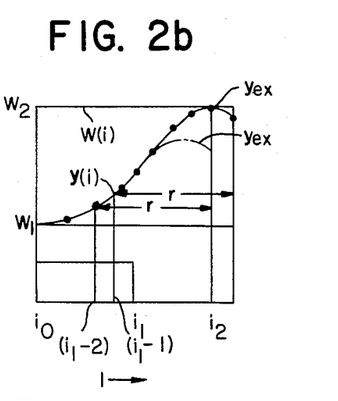
FIG. 2(b) is a diagram showing the manner in which a controlled variable approaches a new target value when a manipulated variable is changed once under a transient condition for discrete time control.

The discrete-time model 22 thus attained is used to determine an on-off swithcing controlled variable to be given to the controlled system 1 at a next sampling period in the next predictive on-off switching control. Under the transient-condition control, a switching time for binary manipulated-variable levels is computed for the discrete-time model 22 to give optimum transient characteristics over a plurality of sampling steps in the future. FIG. 2(a) is a graph showing the manner in which the controlled variable varies under the transient condition in continuous time control, and FIG. 2(b) is a graph showing the manner in which the controlled variable varies under the transient condition in discrete time control. Assuming that a target value varies from $w_1$ to $w_2$ at a time $t_0$ in FIG. 2(a), a controlled variable y(t) approaches the new target value $w_2$ with time. There is an optimum switching time $t_1$ for controlled-variable levels such that a controlled variable $y_2$ will be:

$$w_2 - y[t_2] = 0 \quad (12)$$

$$\dot{y}[t_2] = 0 \quad (13)$$

at a time $t_2$ later than the time $t_0$. By changing the manipulated variable at the time $t_1$, the controlled variable can be changed so as to be the new target value $w_2$ with optimum transient characteristics without overshooting.

The above characteristics can be achieved in discrete time control since the time $t_1 - t_0$ can be approximated by the time $(t_i - t_0)T$ if the sampling time t is sufficiently small. The dot-and-dash line in FIG. 2'(b) indicates a manipulated variable u(i) that is changed to the opposite level after a next sampling interval within a predictive time starting from the time $(i_1 - 2)$ and a corresponding controlled variable y(i). The solid line in FIG. 2(b) indicates the predicted values of manipulated and controlled varaibles in a predictive time starting from the time $(i_1 - 1)$. Since control under the transient condition is effected until a predicted future controlled variable y(k) reaches the new target value $w_2$, it is sufficient to determine the position of a limit $y_{ex}$ for the controlled variable for prediction. Assume that a binary manipulated-variable sequence at r predictive steps which is generated by a manipulated-variable sequence generator 23 at a sampling time i under the transient condition is expressed by:

$$U(i+1) = (u_{max}, u_{min}, \ldots u_{min})^T \quad (14)$$

if the target value variation $(w_2 - w_1)$ is positive, and by:

$$U(i+1) = (u_{min}, u_{max}, \ldots u_{max})^T \quad (15)$$

if the target value variation $(w_2 - w_1)$ is negative a predictive controlled-variable sequence generated by a predictive mechanism block 24 is given as follows:

$$y(i+1) = (y(i+2), y(i+r+1)) \quad (16)$$

Figure 3:
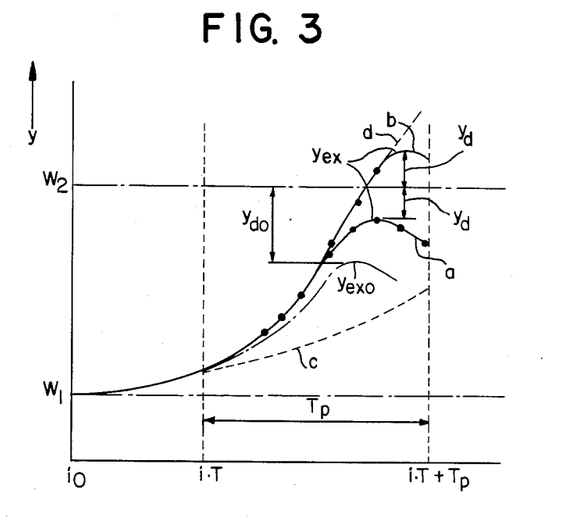
FIG. 3 is a diagram showing a predictive controlled-variable sequence and its performance improvement.

Depending on the position of the limit for the predictive controlled-variable sequence thus generated, an estimating mechanism 25 ascertains whether the manipulated variable $U(i+1)$ at a next sampling time is to be changed or not. For example, if the target value variation is positive as shown in FIG. 3, the controlled-variable sequence predicted at the preceding sampling interval is indicated by the dot-and-dash line. Two controlled-variable sequences a, b predicted now based on the equation (14) are indicated by the solid lines. In the case where a target value deviation $y_d (= w_2 = y_{ex})$ at the limit $y_{ex}$ is smaller than a target value deviation $y_{do}$ predicted at the peceding sampling interval and is positive $(y_d > y_{do}, y_d > 0)$ as represented by the predicted control-variable sequence a, the manipulated-variable expressed by the equation (14) is considered to be optimum, and the manipulated variable $y(i+1)$ is kept at $u_{max}$. In the case where the sign of the target value variation $y_d$ changes at the limit as represented by the predicted controlled-variable sequence b, the manipulated variable for the next sampling interval is changed. Where there is no true limit as indicated by the curves c, d in FIG. 3, the value at the terminal end of a predictive step is regarded as a limit, and the same processing as aforesaid is carried out. As described above, when the deviation at the limit of the predictive controlled-variable sequence is a positive minimum (when $w_1 < w_2$) and (when the deviation is a negative maximum when $w_1 > w_2$), the controlled-variable sequence is regarded as optimum for discrete-time control under the transient condition. Thereafter, an optimum manipulated-variable sequence selector block 26 selects a manipulated variable generated by the manipulated-variable sequence generator 23 dependent on the estimation of the estimating mechanism, and applies the selected manipulated variable to the changeover switch 11.

Normal-condition control function:

In the transient-condition control function effected by the ASC function block 7, the discrete-time model produced by parameter estimation for the control system 1 is expressed by the pulse transfer function $G(z)$ in a z region as indicated by the equation (2). The pulse transfer function $G(z)$ is converted to an s-region transfer function $G(s)$ for continuous time, given by the following equation, as described in the document (2), Kazutaka Nagakawa "Automatic tuning PID controller", September 1983, Computrol, No. 3, 125/129, Corona-sha, and the document (3), referred to in the document (2), Shigemasa "Study of a method of deriving s-region low-frequency characteristics from a pulse transfer function", 20th SICE scientific lecture meeting, 1981:

$$G(s) = \frac{1}{G_0 + G_1 s + G_2 s^2 + G_3 s^3} \tag{17}$$

By substituting $z = e^{TS}$ for z in the equations (2) and (3), getting the Maclaurin expansion of the exponential part in view of the sampler 0th-order holder, and comparing the coefficients, the following results are obtained:

$$G_0 = H_0 \tag{18}$$
$$G_1 = H_1 - (T/2)G_0$$
$$G_2 = H_2 - (T/2)G_1 - (T^2/6)G_0$$
$$G_3 = H_3 - (T/2)G_2 - (T^2/6)G_1 - (T^3/24)G_0$$

where $$H_0 = A_0/B_0 \tag{19}$$
$$H_1 = (A_1 - H_0 B_1)/B_0$$
$$H_2 = (A_2 - H_0 B_2 - H_1 B_1)/B_0$$
$$H_3 = (A_3 - H_0 B_3 - H_1 B_2 - H_2 B_1)/B_0$$
$$A_0 = 1 + \Sigma a_j \tag{20}$$
$$A_1 = -T\Sigma j a_j$$
$$A_2 = (T^2/2)\Sigma j^2 a_j$$
$$A_3 = -(T^3/6)\Sigma j^3 a_j$$
$$B_0 = \Sigma b_j$$
$$B_1 = -T\Sigma j b_j$$
$$B_2 = (T^2/2)\Sigma j^2 b_j$$
$$B_3 = -(T^3/6)\Sigma j^3 b_j$$

Then, I-PD parameters are determined by using the s-region transfer function $G(s)$, as described in the document (4), Toshiyuki Kitamori "Method of designing a sampling value control system based on a partial knowledge of a controlled system", Collected papers of Measurement and Automated Control Society, 15–5, 695/700, 1979. An I-PD control system is shown as a block diagram in FIG. 4. The I-PD control system includes a sampled-value integrating block 40 wherein a normal positional deviation is 0 for continued compensation, the block 40 being indicated by the following equation:

$$k^*/\Delta \tag{21}$$

Figure 4:
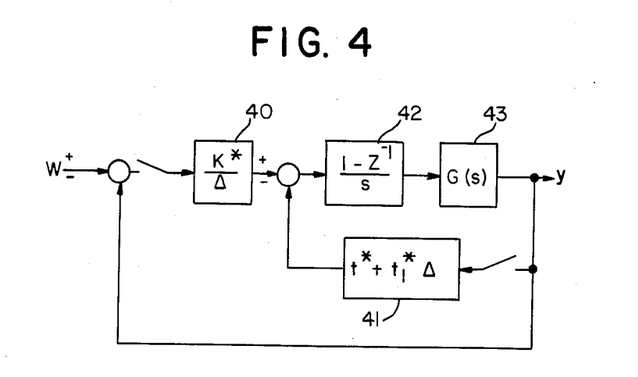
FIG. 4 is a block diagram of an I-PD control system.

A block 41 is a sampled-value PD compensation element for achieving stability and quick response for feedback compensation, the block 41 being indicated by:

$$f_0^* + f_0^*\Delta + \ldots \tag{22}$$

A block 42 comprises a 0th-order hold circuit, and a block 43 is a system to be controlled with continuous time. Parameters of the I-PD control system are computed on the basis of the s-region transfer function $G(s)$. $\Delta$ is an operator corresponding to a differential operator x and is represented by:

$$\Delta = (1 - z^{-1})/T \tag{23}$$

The transfer function of a control system expressed by a denominator series is represented by:

$$G_0(s) = \frac{1}{a_0 + a_1 \sigma s + a_2 \sigma^2 s^2 + a_3 \sigma^3 s^3 + \ldots} \tag{24}$$

A coefficient series, $$\{a_0, a_1, a_2, a_3, a_4 \ldots\} = \{1, 1, 0.5, 0.15, 0.03, \ldots\} \tag{25}$$

is used here to give a preferable response waveform for the control system. The parameters of the equations (21), (22) are equalized to the denominator series of the transfer function from lower orders to high orders as the number of adjustable parameters of the control apparatus is permitted, and the time scale coefficients are reduced as much as possible. Taking the sampler 0th-order holder into account for the equations (21) and (22), and approximating the continuous time system, parameters are determined as follows:

$$f_0^* = q_0(k^*, \sigma) \tag{26}$$
$$f_1^* = q_1(k^*, \sigma) + (\tfrac{1}{2})Tq_0(k^*, \sigma)$$
$$f_2^* = q_2(k^*, \sigma) + Tq_1(k^*, \sigma) + (\tfrac{1}{3})T^2 q_0(k^*, \sigma)$$
$$f_3^* = q_3(k^*, \sigma) + (\tfrac{3}{2}) Tq_2(k^*, \sigma) + (11/12)T^2 q_0(k^*, \sigma) +$$
$$(\tfrac{1}{4})T^3 q_0(k^*, \sigma)$$

where $$q_j(k^*, \sigma) = k^* a_{j+1} \sigma^{j+1} - G_j \tag{27}$$
$$(j = 0, 1, 2 \ldots)$$

By eliminating $f_2^*$, $f_3^*$ and determining the undertermined parameter $k^*$ in the equation (26) in order to effect IP operation, the following equations for determining the parameters are established:

$$k^* = \frac{G_1 + TG_1 + (\tfrac{1}{2})T^2G_0}{\sigma(a_3\sigma^2 + Ta_2\sigma + (\tfrac{1}{2})T^2)} \quad (28)$$

$$f_0^* = k^*\sigma - G_0 \quad (29)$$

$$f_1^* = k^*a_2\sigma^2 + (\tfrac{1}{2})Tk^*\sigma + (-G_1 - (\tfrac{1}{2})TG_0)$$

where is the positive minimum root of the equation:

$$(G_2 + TG_1 + T^2G_0)a_4\sigma^3 + \quad (30)$$
$$(-G_3 + (7/12)T^2G_1 + (\tfrac{1}{2})T^3G_0)\,a_3\sigma^2 +$$
$$(-G_3 - (7/12)TG_2 + (1/18)T^3G_0)Ta_2\sigma^3 +$$
$$(1(\tfrac{1}{2})G_3 - (\tfrac{1}{2})TG_2 - (1/18)T^2G_1)T^2 = 0$$

The I-PD parameters determined by an I-PD parameter determining mechanism 31 are applied to an I operating block 32 and a PD operating block 33. The I operating block 32 is supplied with the sampled value from the measuring unit 4 and the preset value via an adding point 34, and the PD operating block 33 is supplied with the sampled value. Based on the parameters, the operating blocks 32, 33 effect sampling control for a continuous manipulated variable, and their outputs are added by an adding point 35.

The I-PD control mechanism of the above design is shown in detail in FIG. 4. Based on the block diagram of FIG. 4, the following equation is established:

$$(k^*/\Delta)E(z)-(f_0^*+f_1^*\Delta)Y(z)=zU(z) \quad (31)$$

where E(z), Y(z), U(z) are z-converted values of the deviation e(i), the controlled variable y(i), and the manipulated variable u(i). By putting the equation (23) in the equation (31), a differential equation:

$$u(i+1) = u(i) + k^*Te(i) - \left(f_0^* + \frac{f_1}{T}\right)y(i) + \quad (32)$$
$$\left(f_0^* + \frac{2f_1^*}{T}\right)y(i-1) + \frac{f_1^*}{T}y(i-2)$$

is obtained. Using this equation, a manipulated variable u(i+1) at a next sampling time is computed. The outputs from the I operating block 32 and the PD operating block 33 are added and applied to the changeover switch 11.

Operation of the control function switching mechanism:

The transient-condition control using the ASC function block 7 and the normal-condition control using the normal-condition control function block 8 are selected one at a time by the control function switching mechanism 6, such that the signals applied to the changeover switches 5, 10, 11, 12 are selected as input and output signals of either one of the blocks. The control function switching mechanism 6 is supplied with the preset value w(i) and the controlled variable y(i), selects one of them by comparing the deviation $y_d(i)$ and a full control range, the deviation $y_d(i)$ being given by:

$$y_d(i)=|y(i)-w(i)|$$

Figure 5:
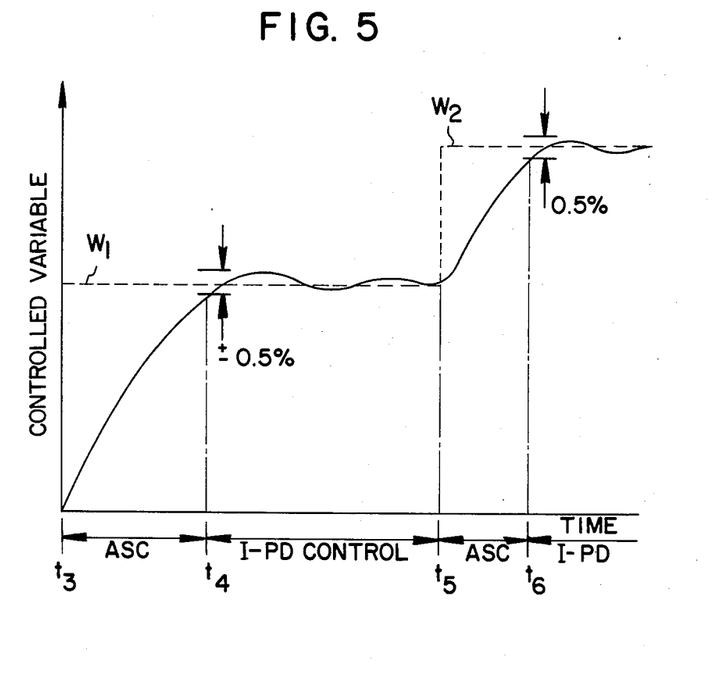
FIG. 5 is a graph showing a controlled condition, illustrative of time-dependent changes of a setting and a controlled variable.

FIG. 5 is a graph showing the manner in which the controlled variable changes by varying the preset value. When the operation is initiated at a time $t_3$, the changeover switches 5, 10, 11 are shifted to select input and output signals of the ASC function block 7 up to a time $t_4$ since the deviation $y_d$ is sufficiently larger than the full control range, whereupon transient-condition control by the ASC function is performed as shown in FIG. 5. As the control variable yi is increased, and at a time when the deviation $y_d$ is 0.5% of the full control range, the changeover switches 5, 10, 11 are operated by the control function switching mechanism 6 to select input and output signals of the normal-condition control function block 8. At the same time, the switch 12 is turned off to cut off the input from the controller 2 to the parameter estimating mechanism 21. At this time, as described above, I-PD parameters are determined by the I-PD parameter determining mechanism 31 based on the discrete-time model 22 of the ASC function block 7. I-PD control is then effected from the time $t_4$ on. When the preset value is changed at a time $t_5$, the ASC is performed under the transient condition, and the I-PD control is effected from a time $t_6$ on.

Figure 6:
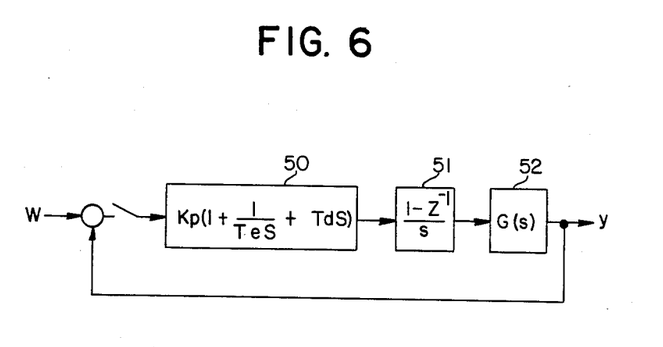
FIG. 6 is a block diagram of a PID control system.

While the continuous manipulated-variable sampling control is carried out by the I-PD control in the normal-condition control function block, PID control may be performed in the normal-condition control function block as illustrated in FIG. 6. FIG. 6 shows a PID control function block 50, a 0th-order hold circuit 51, and a system 52 to be controlled with continuous time. Although the PID control system is quickly responsive to variations in a target value because it is of a continuous compensation type, it may frequently happen to fail to provide control against the influence of disturbance since limit and zero points are offset. To solve this problem, PID control parameters may be computed by using the discrete-time model 22 computed by the ASC function block as described in the document (4) on page 133, and the PID control may be performed based on the computed PID control parameters.

Although a certain preferred embodiment has been shown and described, it should be understood that many changes and modifications may be made therein without departing from the scope of the appended claims.

We claim:

1. A discrete time control apparatus for controlling a system in continuous time, comprising:
    sampling/detecting means for detecting a controlled system variable at each sampling interval;
    control means for selectively switching operation on the system at each sampling interval between a binary mode and a continuous mode, the control means being responsive to an external input;
    discrete-time adaptive switching control means for (i) estimating and updating model parameters at said each sampling interval based on a manipulated variable to be applied to an actuator effecting the binary mode wherein the controlled variable is detected by said sampling/detecting means in order to adapt a discrete-time model to said system, and for (ii) selecting a sequence of predicted controlled variables over predictable sampling intervals in response to application of a possible controlled-variable sequence over certain sampling intervals to said discrete-time model, thereby determining a controlled variable for said actuator;

continuous manipulated-variable sampling control means for computing parameters based on the discrete-time model estimated by said discrete-time adaptive switching control means for effecting continuous control on said system; and switching means for selecting, one at a time, said discrete-time adaptive switching control means and said continuous manipulated-variable sampling control means based on a target preset value and the present controlled variable.

2. A discrete time control apparatus according to claim 1, wherein said continuous manipulated-variable sampling control means comprises Integrating-Proportional and Derivative (I-PD) control means.

3. A discrete time control apparatus according to claim 1, wherein said continuous manipulated-variable sampling control means comprises Proportional Integral and Derivative (PID) control means.

4. A discrete time control apparatus as recited in claim 1, wherein the sampling/detecting means comprises means for adding the controlled system variable to a disturbance and a measuring unit.

5. A discrete time control apparatus as recited in claim 1, wherein the control means for selectively switching operation of the system further comprises means for distinguishing normal operating conditions from transient conditions.

6. A discrete time control apparatus as recited in claim 5, further comprising means for selecting the binary mode under transient conditions and the continuous mode under normal operating conditions.

7. A discrete time control apparatus as recited in claim 5, wherein the means for distinguishing transient from normal operating conditions further comprises means for comparing a preset value and a value obtained from a measuring unit.

8. A discrete time control apparatus as recited in claim 1, wherein the switching means for selecting the adaptive switching control means and the continuous control means comprises:

(a) means for routing a preset value and a measured value to the one of the adaptive switching control means and the continuous control means;

(b) means for routing a value determined by the selected means to the controlled system; and (c) the switching means being operatively connected to the control means for selectively switching between the adaptive switching control means and the continuous control means.

* * * * *